United States Patent [19]
Snyder, Jr.

[11] B 3,914,220

[45] Oct. 21, 1975

[54] 1-[(5-NITROFURFURYLIDENE)AMINO]-4(AND 5)-PHENYL-2-IMIDAZOLIDINONE

[75] Inventor: Harry R. Snyder, Jr., Norwich, N.Y.

[73] Assignee: Morton-Norwich Products, Inc., Norwich, N.Y.

[22] Filed: Aug. 24, 1973

[21] Appl. No.: 391,210

[44] Published under the Trial Voluntary Protest Program on January 28, 1975 as document no. B 391,210.

[52] U.S. Cl. ......... 260/240 A; 424/273; 260/240 G; 260/554
[51] Int. Cl.² ..................................... C07D 233/02
[58] Field of Search ............................. 260/240 A

[56] References Cited
UNITED STATES PATENTS 2,746,960   5/1956   Gever et al. ............... 260/240 A
3,407,195   10/1968   Snyder ...................... 260/240 A

OTHER PUBLICATIONS

Chemical Abstracts Vol. 77, abst. No. 14746w (1972) (abst. of Pugh et al., J. Med. Chem. 1972, Vol. 15, pp. 270–273).

*Primary Examiner*—John D. Randolph
*Attorney, Agent, or Firm*—Anthony J. Franze

[57] ABSTRACT

New nitrofuran compounds, 1-[(5-nitrofurfurylidene)-amino]-4 (and 5)-phenyl-2-imidazolidinone, are effective antibacterial agents and are also useful in suppressing *Salmonella typhimurium* infection in poultry.

3 Claims, No Drawings

1-[(5-NITROFURFURYLIDENE)AMINO]-4(AND 5)-PHENYL-2-IMIDAZOLIDINONE

This invention relates to nitrofuran compounds and particularly to 1-[(5-nitrofurfurylidene)amino]-4(and 5)-phenyl-2-imidazolidinone. They are capable of inhibiting bacterial growth and are thus adapted to be combined in various forms such as dusts, suspensions, solutions, sprays and unguents, using commonly employed excipients to provide compositions inimical to the growth of susceptible bacteria. Illustrative of the antibacterial potency of the compounds of this invention as determined in the commonly employed serial dilution technique are the results set forth in the table here-below:

| Compound | Minimum Inhibitory Concentration in mcg./ml. | | | |
|---|---|---|---|---|
| | S. aureus | E. coli | S. faecalis | C. liquefaciens |
| A | 1.5 | 3.1 | 3.1 | 25 |
| B | 3.1 | 12.5 | 6.25 | 50 |

A = 1-[(5-nitrofurfurylidene)amino]-4-phenyl-2-imidazolidinone
B = 1-[(5-nitrofurfurylidene)amino]-5-phenyl-2-imidazolidinone The compounds of this invention are also useful in poultry disease. When administered to chickens harboring Salmonella typhimurium infection at a level of 0.022 percent by weight of the food supply, these compounds check the ravages of that disease.

The methods currently favored for the preparation of the compounds of this invention are disclosed in the following examples:

EXAMPLE I

1-[(5-Nitrofurfurylidene)amino]-4-phenyl-2-imidazolidinone

Part A: 1-Acetamido-4-phenyl-2-imidazolidinone.

A sample of 1-acetamido-4-phenyl-2-imidazolone (48.4 g. 0.233 mole) was placed in a 1000 ml pressure bottle together with ethanol (ca.600 ml) and 5% Pd/C catalyst (50 g of a 50 percent water mixture). The material was shaken under an atmosphere of hydrogen (40 psi) for 3 hr. The hydrogen absorption was 18 lb. (theor. - 17.3). The mixture was filtered hot, and the solvent was removed under reduced pressure to yield 37.1 g (76 percent), m.p. 196°–200°C.

An analytical sample was prepared by recrystallization from 2-propanol (Darco), m.p. 206°–208°C.

Anal. calcd. for $C_{11}H_{13}N_3O_2$: C, 60.26; H, 5.98; N, 19.15.

Found : C, 60.02, 60.17; H, 6.08; 6.17; N, 19.34, 19.42.

Part B.: 1-[(5-nitrofurfurylidene)amino]-4-phenyl-2-imidazolidinone

A mixture of 5-nitrofurfural and 1-acetamido-4-phenyl-2-imidazolidinone (37.1 g, 0.17 mole) in aqueous methanol was acidified with conc. HCl. The mixture was heated on the steam bath for an hour. After cooling in an ice bath, the product was collected and dried to yield 50.2 g (99 percent), m.p. 186°–188°C. The material was recrystallized from 2-propanol (containing a small amount of nitromethane) to yield 32.4 g, m.p. 187°–189°C.

Anal. calcd. for $C_{14}H_{12}N_4O_4$: C, 56.00; H, 4.03; N, 18.66.

Found : C, 56.08, 56.04; H, 3.92, 4.14; N, 18.58; 18.88.

EXAMPLE II

1-[(5-Nitrofurfurylidene)amino]-5-phenyl-2-imidazolidinone

Part A: Benzaldehyde 4-(β-Hydroxyphenethyl)-semicarbazone

A mixture of benzaldehyde semicarbazone (120 g, 0.73 mole) and 2-amino-1-phenylethanol (100 g, 0.73 mole) was placed in a flask together with 2-ethoxyethanol (5500 ml). The mixture was heated at reflux for 4.5 hr. The solvent was removed under reduced pressure and the residue crystallized from aq. 2-propanol. The yield was 194 g (95.5 percent), m.p. 75°–78°.

An analytical sample was prepared by recrystallization from methanol (very soluble), m.p. 105°–110°.

Anal. Calcd. for $C_{16}H_{17}N_3O_2$: C, 67.82; H, 6.05; N, 14.83

Found: C, 67.77, 67.65; H, 6.14, 6.13; N, 15.18, 15.01.

Part B: Benzaldehyde 4-(β-chlorophenethyl)semicarbazone

Benzaldehyde 4-(β-hydroxyphenethyl)semicarbazone (56.0 g, 0.2 mole) was placed in a 1000 ml, 3-necked flask fitted with a stirrer, reflux condenser topped by a drying tube, thermometer, and an addition funnel. Benzene (400 ml) was added and the mixture was stirred and heated to reflux. At this point, external heat was removed and thionyl chloride (40 ml) was added. The temperature was kept at 70°–80°C. The reaction mixture was stirred for 2 hours; it attained room temperature. An equal volume of anhydrous ether was added. The product was collected, washed with ether, and dried to yield 40 g of crude material.

The crude material (40 g) was placed in a flask together with toluene (200 ml) and benzene (300 ml). The mixture was refluxed for 6 hr during which time a clear solution formed. Upon cooling, crystals formed which were collected to yield 22.8 g, m.p. 147°–150°C. The filtrate was evaporated to dryness under reduced pressure to yield 8.4 g, m.p. 144°–147°C. The total yield was 30.2 g (75.5%) or 50 percent over-all yield.

An analytical sample was prepared by recrystallization from a benzene-hexane mixture, m.p. 149°–150°C.

Anal. Calcd. for $C_{16}H_{16}ClN_3O$: C, 63.68; H, 5.35; N, 13.92

Found : C, 63.88; H, 5.31; N, 13.72.

Part C: 1-Benzylideneamino-5-phenyl-2-imidazolidinone

Benzaldehyde 4-(β-chlorophenethyl)semicarbazone (23.0 g, 0.07 mole) was placed in a 500 ml, 3-necked flask equipped with a stirrer, thermometer, and drying tube. Dimethylformamide (200 ml) was added together with 50 percent oil dispersion of sodium hydride (5.0 g, 0.1 mole). A vigorous reaction occurred immediately. The mixture became very thick and more dimethylformamide (ca. 150 ml) was added. The mixture was stirred at 100°–110°C for 3 hr. The reaction mixture was cooled and filtered. The product was dried to yield 10.2 g, m.p. 218°–220°C. Evaporation of the filtrate to dryness yielded another 9.7 g, m.p. 155°–196°C. The total yield was 19.9 g (98 percent).

Recrystallization of the crude material from nitromethane gave analytically pure material, m.p. 217°–219°C.

Anal. Calcd. for $C_{16}H_{15}N_3O$: C, 72.43; H, 5.70; N, 15.84.

Found: C, 72.62; H, 5.79; N, 15.98.

Part D: 1-[(5-nitrofurylidene)amino]-5-phenyl-2-imidazolidinone

An aqueous methanolic solution of 1-benzylideneamino-5-phenyl-2-imidazolidinone (72.0 g, 0.272 mole) was acidified with conc. hydrochloric acid. 5-Nitrofurfural (38 g, 0.272 mole) was added, and the mixture was heated on the steam bath for 2 hr. The mixture was evaporated to dryness under reduced pressure. The residue was recrystallized from acetic acid to yield 39 g (48 percent), m.p. 162°–164°C. The material was recrystallized from acetic acid (Darco) to yield 30 g, m.p. 192°–194°C.

Anal. Calcd. for $C_{14}H_{12}N_4O_4$: C, 56.00; H, 4.03; N, 18.66.

Found: C, 55.79; 55.84; H, 4.01, 3.99; N, 18.65, 18.59.

What is claimed:
1. A compound of the formula:

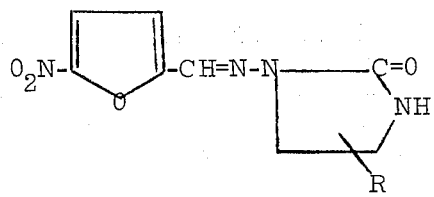

wherein R is 4- or 5-phenyl.

2. The compound 1-[(5-nitrofurfurylidene)amino]-4-phenyl-2-imidazolidinone.

3. The compound 1-[(5-nitrofurfurylidene)amino]-5-phenyl-2-imidazolidinone.

* * * * *